United States Patent [19]
Corrigan et al.

[11] Patent Number: 5,983,306
[45] Date of Patent: Nov. 9, 1999

[54] PCI BRIDGE WITH UPSTREAM MEMORY PREFETCH AND BUFFERED MEMORY WRITE DISABLE ADDRESS RANGES

[75] Inventors: Brian E. Corrigan; Alan D. Rymph, both of Wichita, Kans.

[73] Assignee: LSI Logic Corporation, Milpitas, Calif.

[21] Appl. No.: 08/929,357

[22] Filed: Sep. 12, 1997

Related U.S. Application Data

[63] Continuation of application No. 08/674,592, Jun. 28, 1996, Pat. No. 5,881,254, and a continuation of application No. 08/673,654, Jun. 28, 1996.

[51] Int. Cl.$^6$ ..................................................... G06F 13/00
[52] U.S. Cl. ............................................ 710/129; 710/128
[58] Field of Search ..................................... 395/308, 309

[56] References Cited

U.S. PATENT DOCUMENTS

| | | | |
|---|---|---|---|
| 4,965,723 | 10/1990 | Kirk et al. | 364/200 |
| 5,083,260 | 1/1992 | Tsuchiya | 395/325 |
| 5,113,369 | 5/1992 | Kinoshita | 395/325 |
| 5,257,391 | 10/1993 | DuLac et al. | 395/800 |
| 5,263,139 | 11/1993 | Testa et al. | 395/325 |
| 5,301,281 | 4/1994 | Kennedy | 395/325 |
| 5,333,277 | 7/1994 | Searls | 395/325 |
| 5,345,565 | 9/1994 | Jibbe et al. | 395/325 |
| 5,353,415 | 10/1994 | Wolford et al. | 395/325 |
| 5,379,384 | 1/1995 | Solomon | 395/325 |
| 5,392,407 | 2/1995 | Heil et al. | 395/325 |

(List continued on next page.)

FOREIGN PATENT DOCUMENTS

| | | | |
|---|---|---|---|
| 0489504 | 11/1991 | European Pat. Off. | G06F 13/28 |
| 0631241 | 12/1994 | European Pat. Off. | G06F 15/16 |
| 0707357 | 12/1995 | European Pat. Off. | G06F 11/10 |
| 0756235 | 1/1997 | European Pat. Off. | G06F 13/40 |
| 9314455 | 7/1993 | WIPO | G06F 3/06 |

OTHER PUBLICATIONS

PCI Local Bus Specification Revision 2.1; PCI Special Interest Group, Jun. 1, 1995, p. 4.
EDN—Electrical Design News, vol. 40, No. 13, Jun. 22, 1995, Newton, MA, US, pp. 16 & 18; Intel i960JF Integrates PCI Interface.
Proceedings of the IEEE International Conference on Computer Design: VLSI in Computers and Processors; Oct. 10–12, 1994; Cambridge, MA, US, pp. 409–412; M.J. Garcia et al: Single Chip PCI Bridge and Memory Controller for PowerPC Microprocessors.
A Case for Redundant Arrays of Inexpensive Disks (RAID); David A. Patterson et al.; Dec. 1987; pp. 1–24.
IBM Technical Disclosure Bulletin; Method for Improving Peripheral Component Interconnect Bus Bandwidth for Systems with Limited Prefetch; vol. 40 No. 01; Jan., 1997; pp. 23–25.
PCI to PCI Bridge Architecture Specification, Revision 1.0, Apr. 5, 1994.

*Primary Examiner*—Ayaz R. Sheikh
*Assistant Examiner*—David A. Wiley
*Attorney, Agent, or Firm*—Wayne P. Bailey; Daniel N. Fishman

[57] ABSTRACT

A bus bridge circuit having at least one register to store address ranges to enable or disable prefetch in upstream memory read transactions or upstream write transaction buffering/posting data to specific devices. The use of address ranges allows the present invention to provide selectable control of prefetch for upstream memory read transaction flow. This feature allows the continued use of read prefetch for targets that allow upstream read prefetch while disabling upstream read prefetch for targets that do not allow upstream read prefetch. Additionally, the use of the address range allows upstream memory write transaction flow without utilizing data buffering or posting for specific targets. This feature provides immediate delivery of upstream data to selected targets by selectively disabling buffering/posting of upstream memory write commands as performed by a FIFO buffer. Thus providing immediate delivery of upstream data to selected targets while buffering/posting upstream memory write commands for other targets.

9 Claims, 3 Drawing Sheets

U.S. PATENT DOCUMENTS

| | | | |
|---|---|---|---|
| 5,394,528 | 2/1995 | Kobayashi et al. | 395/325 |
| 5,396,602 | 3/1995 | Amini et al. | 395/325 |
| 5,522,050 | 5/1996 | Amini et al. | 395/306 |
| 5,533,204 | 7/1996 | Tipley | 395/288 |
| 5,548,730 | 8/1996 | Young et al. | 395/280 |
| 5,557,758 | 9/1996 | Bland et al. | 395/308 |
| 5,559,968 | 9/1996 | Stancil et al. | 395/306 |
| 5,560,022 | 9/1996 | Dunstan et al. | 395/750 |
| 5,574,937 | 11/1996 | Narain | 395/800 |
| 5,581,714 | 12/1996 | Amini et al. | 395/308 |
| 5,586,268 | 12/1996 | Chen et al. | 397/250 |
| 5,590,377 | 12/1996 | Smith | 395/842 |
| 5,594,882 | 1/1997 | Bell | 395/421.02 |
| 5,608,876 | 3/1997 | Cohen et al. | 395/381 |
| 5,631,912 | 5/1997 | Mote, Jr. | 371/22.3 |
| 5,632,021 | 5/1997 | Jennings et al. | 395/309 |
| 5,634,033 | 5/1997 | Stewart et al. | 395/441 |
| 5,644,470 | 7/1997 | Benedict et al. | 361/686 |
| 5,664,122 | 9/1997 | Rabe et al. | 395/308 |
| 5,771,387 | 6/1998 | Young et al. | 395/733 |

PCI BRIDGE WITH UPSTREAM MEMORY PREFETCH AND BUFFERED MEMORY WRITE DISABLE ADDRESS RANGES

RELATED PATENTS

This patent is a continuation of U.S. patent application Ser. No. 08/674,592 entitled INTER-BUS BRIDGE CIRCUIT WITH INTEGRATED MEMORY PORT filed Jun. 28, 1996 U.S. Pat. No. 5,881,254, which is hereby incorporated by reference.

This patent is a continuation of U.S. patent application Ser. No. 08/673,654 entitled SCALABLE HIERARCHICAL MEMORY STRUCTURE FOR HIGH DATA BANDWIDTH RAID APPLICATIONS filed Jun. 28, 1996, which is hereby incorporated by reference.

BACKGROUND OF THE INVENTION

1. Field of the Invention

This invention relates to the field of bus bridge integrated circuits and in particular to a bus bridge circuit design that includes registers to store configuration parameters pertaining to upstream memory operations.

2. Discussion of Related Art

Bridge circuits are known to connect a first electronic bus to a second electronic bus. The bridge circuit serves to adapt the signals of the two busses to enable data exchange between the two bus signal standards. Frequently, bridge circuits are used to convert between different signaling standards defined for the first and second busses. Another common application of bus bridge circuits, as discussed in the related application Ser. No. 08/673,654 incorporated herein by reference, is to connect multiple, often hierarchical busses to common devices or memory subsystems.

In RAID storage subsystem control applications, for example, a Peripheral Computer Interconnect (PCI) bus is used to connect various peripheral I/O devices through a bridge circuit to a centralized PCI bus for the overall control of all I/O devices in the subsystems as well as the cache memory subsystem. The bus connecting the RAID subsystem CPU to the PCI bus bridge is referred to herein as the primary side or primary I/O bus, and attaches to the primary bus port of the bridge. The bus connected to the bus bridge circuit on the opposite side of the bridge relative to the primary side is referred to herein as the secondary side or secondary I/O bus and connects to the secondary bus port of the bridge. Transactions flowing through the bridge circuit from the primary side to the secondary side are referred to herein as downstream transactions or downstream flow. Transactions flowing through the bridge circuit from the secondary side to the primary side are referred to herein as upstream transactions or upstream flow.

The device initiating or originating the transaction request is known as the initiator or busmaster. The device to which the initiator directs its request is the target. When, for example, a CPU originates a transaction request it is the initiator, that is, busmaster. The target, for example, might be cache or other memory module.

If a read transaction has been performed and more data accesses may be required, data that may be requested is prefetched. The PCI bridge is designed to perform read prefetches from the target faster than necessary, and transfer the data to the initiator in response to future read transactions. This technique is known to enhance read transaction performance.

With regard to PCI bus architecture, read prefetch can be implemented with or without a buffer. When read prefetch is implemented with a buffer, data within data addresses following the current area of memory being read, are stored in a buffer and transferred to the initiator in response to possible future read transactions. Read prefetch with a buffer allows the PCI bus bridge to utilize the PCI burst mode without a lockstep handshake. During burst mode, the PCI bus bridge joins the addresses of these sequential read operations, transfers the beginning address once, and performs the data transfer. Successive addresses of these sequential read operations are not transferred while the data is transferred because they are implied. Thus, the amount of data transferred during burst mode is increased because the bus is not required to transfer each address during the data transfer.

When read prefetch is not implemented with a buffer, PCI bust mode is still utilized, but multiple data addresses cannot be prefetched. Instead, only one data address in the current area of memory being read can be prefetched, stored in a single register, and transferred to the initiator during the next data phase of the current burst. Since there is no buffer space to store the large amount of prefetched data, both sides of the PCI bus bridge are required to be in lockstep. A handshake is required between both sides of the bridge because the bus slave, or target must wait for the bus master to request the next read operation.

If immediate delivery of write data from initiator to target in a write transaction is not necessary, the PCI bridge can temporarily write data to a buffer within the PCI bus bridge before the write data is transferred to the storage medium such as the RAID disk, cache, or non-volatile memory. This is known to enhance write transaction performance because buffering and posting do not require both sides of bridge to be in lock step. That is when buffering data, there is no requirement for a handshake between both sides of the bridge during each data cycle that is transferring data between sides of the bridge. Although the busmaster or initiator is notified data delivery has occurred, data delivery has not actually occurred but will soon afterwards because the data that is left in the buffer is transferred at a later time.

In the downstream direction, it is known in the art to selectively enable memory read prefetch support. Prefetching can be implemented with or without a buffer. In the upstream direction, it is known in the art to globally disable memory prefetch support. Additionally in the downstream or upstream direction, it is known in the art to globally disable memory write buffering or posting. For more information, the reader is directed to PCI Special Interest Group, PCI to PCI Bridge Architecture Specification, Revision 1.0, Apr. 5, 1994, Hillsboro, Oreg., and PCI Special Interest Group, PCI Local Bus Specification, Revision 2.1, Jun. 1, 1995, Portland, Oreg.

In prior PCI bus bridges, upstream read transactions directed to memory target devices may often use prefetch. If the prefetch of upstream read transactions is directed to certain I/O targets that cannot utilize prefetch, it is known in the art, to provide a device specific bit in configuration space that globally disables upstream transaction read prefetch for all upstream read transactions. When upstream transaction read prefetch is globally disabled, read prefetch remains globally disabled for upstream transactions on a PCI bridge even though there may be other targets that allow read prefetch. The prefetch ability remains globally disabled because the prior PCI bus bridge cannot selectively disable read prefetch on upstream transactions. This reduces system performance for upstream transaction memory read commands to prefetchable main memory. A need exists to selectively enable and disable destinations for prefetch of upstream transaction memory read commands.

Additionally, in prior PCI bridges, buffering or posting of all upstream transaction memory write commands must be globally disabled to guarantee immediate delivery of upstream transaction data to certain targets. This reduces system throughput because the system does not utilize buffering or posting of data for other targets that do not need immediate delivery of upstream transaction data. It is desirable to improve system performance by allowing the immediate delivery of upstream transaction data, for certain targets, and allow upstream transaction buffering/posting of memory write commands for other targets.

SUMMARY OF THE INVENTION

This present invention solves the above and other problems, thereby advancing the useful arts, by providing the use of programmable address registers to configure the PCI bus bridge for selectively enabling and disabling memory read prefetch and memory write buffering/posting of upstream data transactions for targets on the primary I/O bus.

A programmable address register, in configuration space, stores an address range of targets that do not support read prefetch of upstream read transactions. The present invention uses the stored address base and limit to selectively disable read prefetch of upstream transaction memory data for the targets that do not support read prefetch of upstream read transactions. The present invention can also selectively enable or disable the use of a buffer during read prefetch of upstream read transaction. In the present invention the buffer is a first-in-first-out (FIFO) buffer.

When an upstream transaction memory-read command start address falls within this range, the bus bridge circuit will not read more data than that requested by the initiator or bus master of the secondary PCI bus, thus, no prefetch occurs. There are two PCI read commands in addition to the Memory Read command, that provide read access in the memory address area. These two PCI read commands allow more data to be read than the Memory Read command. The Memory Read Multiple allows the device initiating the transaction, the busmaster, to read more than a complete cache line, or a similarly sized data block from the memory without caching. The Memory Read Line command allows the busmaster to read more than two 32-bit data blocks from memory. The present invention selectively disables the prefetch capability of the busmaster for a select target on the primary I/O bus by disabling the PCI burst mode and converting Memory Read Multiple command or Memory Read Line command to a non-prefetch Memory Read command.

The bus bridge circuit of the present invention continues to allow read prefetch of upstream transaction memory data for those targets on the primary I/O bus whose read prefetch capability was not disabled. Thus, read prefetch capability is not disabled for targets whose upstream transaction memory read command start address fall outside of the selected address range.

The programmable address register additionally stores the address base and limit of targets on the primary I/O bus that should be guaranteed immediate delivery of data in upstream transactions. For these targets, the buffering or posting of upstream transaction memory write commands is selectively disabled to allow immediate delivery of data in upstream transactions.

When an upstream transaction memory write command start address falls within this range, the PCI bridge will not utilize a FIFO buffer during the transfer of data. Thus requiring the initiator's write transaction, and the resulting target's write transaction to be synchronized, that is to operate together in lock step. This method guarantees immediate delivery of the data to select targets.

If the upstream transaction memory write command start address does not fall within the selected address range, the bus bridge circuit of the present invention continues to provide buffering or posting for the upstream transaction memory write commands. Thus, start addresses that do not fall within the selected address range belong to targets that do not require immediate delivery of upstream transaction data.

It is therefore an object of the present invention to provide a bus bridge circuit that selectively disables prefetch of upstream transaction memory reads for selective targets on the primary I/O bus while allowing prefetch of upstream transaction memory reads for other targets on the primary I/O bus. Thus improving system performance for upstream transaction memory read commands to prefetchable main memory.

It is a further object of the present invention to provide a bus bridge circuit that selectively disables the buffering or posting of upstream transaction memory write commands. Thus allowing immediate delivery of upstream transaction data for selected targets on the primary I/O bus while allowing buffering or posting of upstream transaction memory write commands for other targets on the primary I/O bus. Thereby improving system throughput because the system is utilizing the use of buffering or posting.

It is further another object of the present invention to provide a bus bridge circuit that uses a programmable register to store the address range, that is, the address base and limit of targets on the primary I/O bus that need the FIFO buffer selectively disabled for upstream buffering or posting of memory write transactions.

The above and other objects, aspects, features, and advantages of the present invention will become apparent from the following description and the attached drawings.

DETAILED DESCRIPTION OF THE PREFERRED EMBODIMENTS

Figure 1:
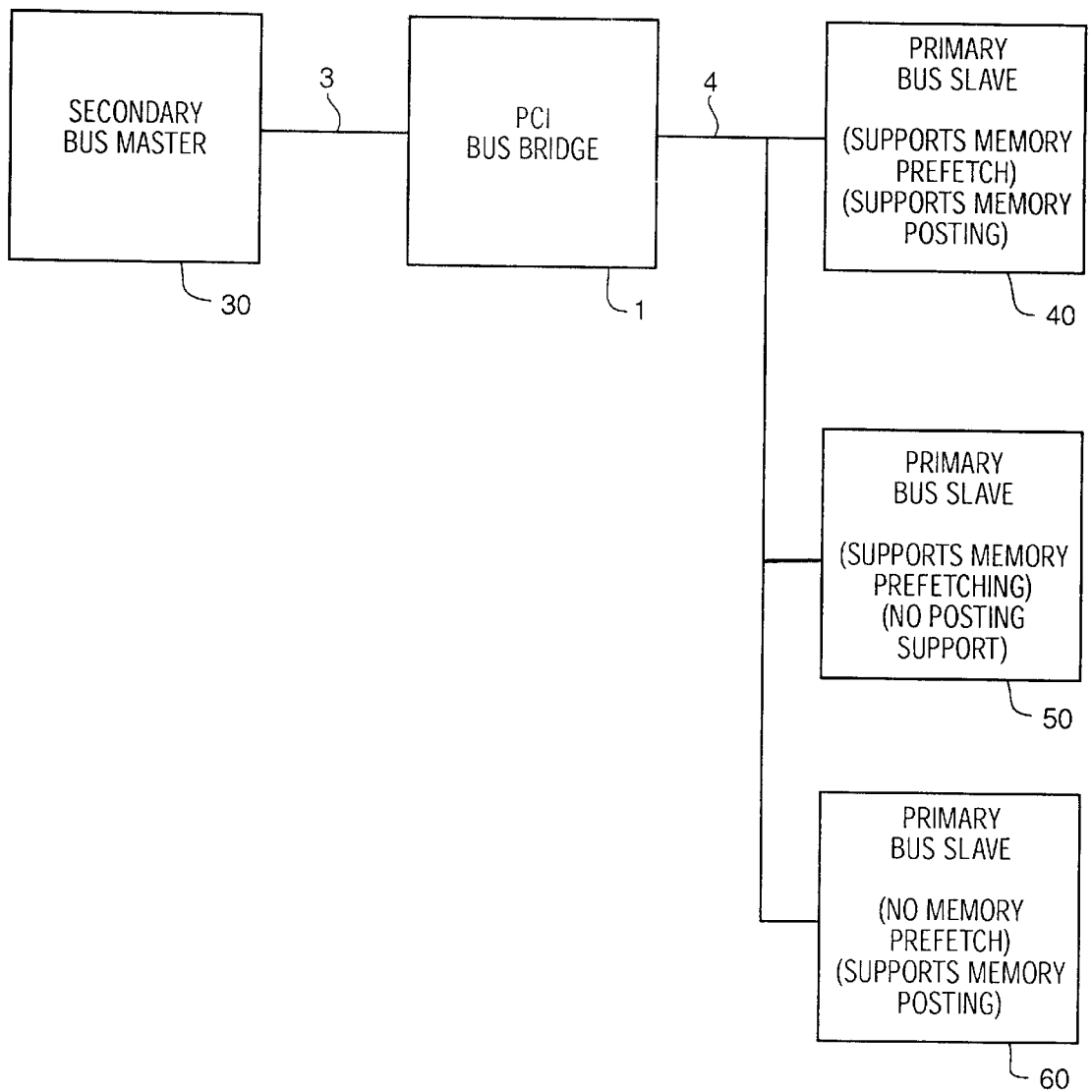
FIG. 1 is a block diagram of the bus bridge circuit in which the bus bridge circuit of the present invention is advantageously applicable.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of the bus bridge circuit in which the bus bridge circuit 1 of the present invention is advantageously applicable. FIG. 1 shows an initiator, the secondary bus master 30, coupled to the secondary I/O bus 3. The PCI bus bridge 1 is coupled to the secondary I/O bus 3 and the primary I/O bus 4. The primary I/O bus 4 is coupled to a primary bus slave 40 that supports upstream transaction memory read prefetch and upstream transaction memory write buffering or posting. Primary I/O bus 4 is also coupled to primary bus slave 50 that supports upstream transaction memory read prefetch, but does not support upstream transaction memory write buffering or posting. Primary I/O bus 4 is also coupled to primary bus slave 60 that does not support upstream transaction memory read prefetch but does support upstream transaction memory write buffering or posting.

In an example of the present invention, secondary bus master 30 initiates an upstream transaction memory read prefetch and primary bus slave 60 is the target. In this example, primary bus slave 60 does not support upstream transaction memory read prefetch. The present invention provides a programmable address register, in configuration space, to selectively disable read prefetch of upstream transaction memory data for targets, such as primary bus slave 60, that do not support read prefetch of upstream read transactions.

In this case, the programmable address register contains the address of primary bus slave 60. Thus, the PCI bus bridge will not read more data than that requested by the secondary bus master 30.

The address of primary bus slave 40, or primary bus slave 50, however, is not stored within the programmable address register, in configuration space, because these targets support upstream transaction memory read prefetch. Thus, if primary bus slave 40, or primary bus slave 50 is the target of an upstream transaction memory read prefetch command, the present invention continues to allow read prefetch of upstream transaction memory data for these targets.

In another example of the present invention, the secondary bus master 30 initiates an upstream transaction memory write command to primary bus slave 50. In this example, primary bus slave 50 does not support upstream transaction memory write buffering or posting. The present invention provides a programmable address register, in configuration space, to selectively disable buffering or posting during the transfer of upstream transaction memory write commands for targets, such as primary bus slave 50, that do not support upstream transaction write buffering or posting. The present invention thus allows immediate delivery of data in upstream memory write transactions to primary bus slave 50.

The address of primary bus slave 40 or primary bus slave 60 is not stored in the programmable address register, within configuration space, because these targets support upstream transaction memory write buffering or posting. Thus, the present invention allows buffering or posting of upstream transaction memory write commands to primary bus slave 40 or primary bus slave 60 because these targets do not require immediate delivery of data in upstream transactions.

Figure 2:
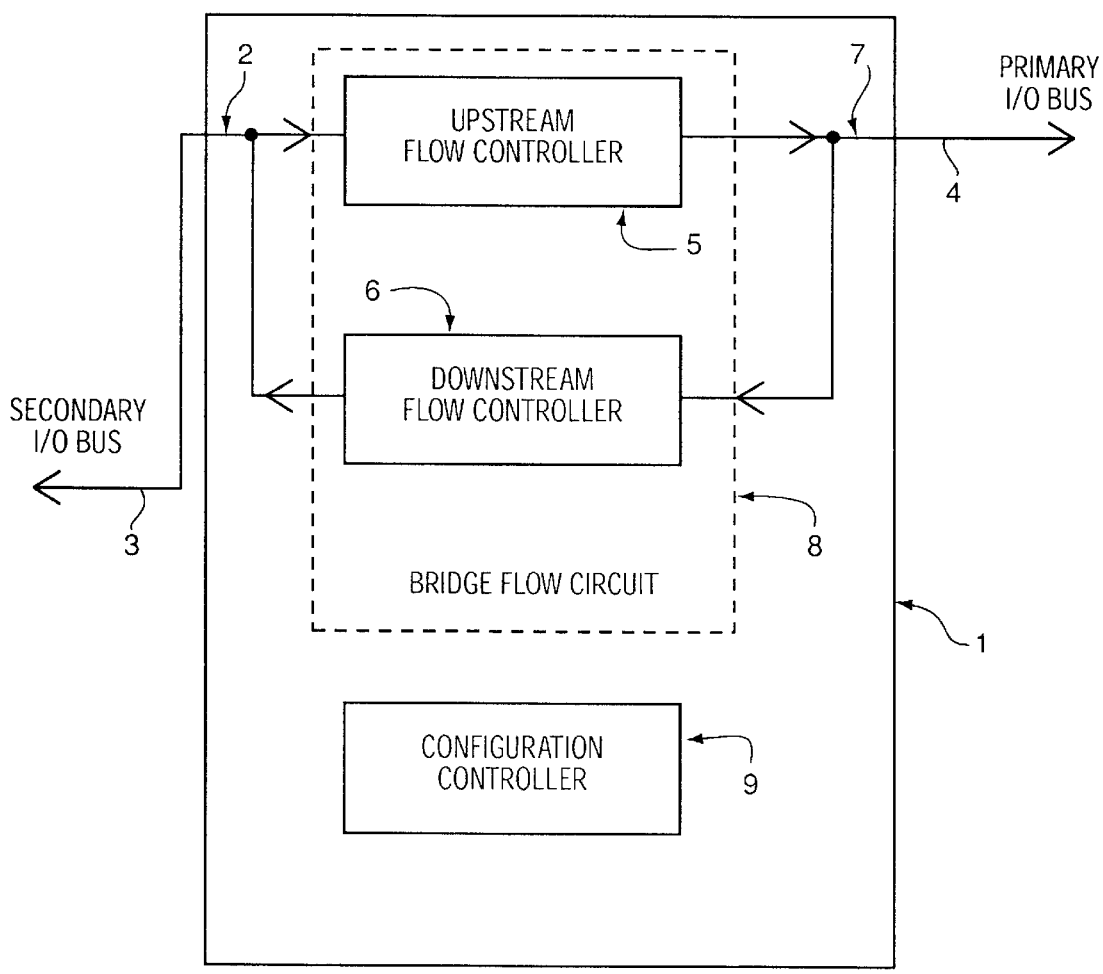
FIG. 2 is a block diagram of the bus bridge circuit of the present invention having a configuration controller and a bridge flow circuit.

FIG. 2 is a block diagram showing the bus bridge circuit 1. The bus bridge circuit 1 controls the bi-directional flow of data between the secondary I/O bus port 2 and the primary I/O bus port 7. For example, a host system (not shown) connected via a secondary I/O bus 3 to a RAID subsystem may access targets within the RAID subsystem, such as a cache buffer (not shown) connected to a primary I/O bus 4 and vice versa.

The bus bridge circuit comprising a configuration controller 9, a bridge flow circuit 8, a secondary I/O bus port 2 connecting to the secondary I/O bus 3, and a primary I/O bus port 7 connecting to the primary I/O bus 4. The configuration controller 9 stores the address ranges for configuring use of the bridge flow circuit 8 for upstream data transactions.

The preferred embodiment uses a standard industry PCI bus. Accordingly, the bus bridge circuit accommodates PCI standards and can be referred to as a PCI bus bridge circuit.

The configuration controller 9 stores the address ranges used to determine the targets on the primary I/O bus that do not allow upstream memory read prefetch transactions or targets on the primary I/O bus that should be guaranteed immediate delivery of upstream memory write transactions. The present invention uses a PCI configuration controller that consists of 256 byte configuration space for each PCI unit. The configuration space is divided into a 64 byte header that contains information to identify the PCI unit and 192 bytes remain for the PCI unit to use as desired.

The bridge flow circuit consists of an upstream flow controller 5 and a downstream flow controller 6. The upstream flow controller directs the data flow for transactions from the secondary I/O bus port 2 to the primary I/O bus port 7. The downstream flow controller directs the data flow for transactions from the primary I/O bus port 7 to the secondary I/O bus port 2.

Figure 3:
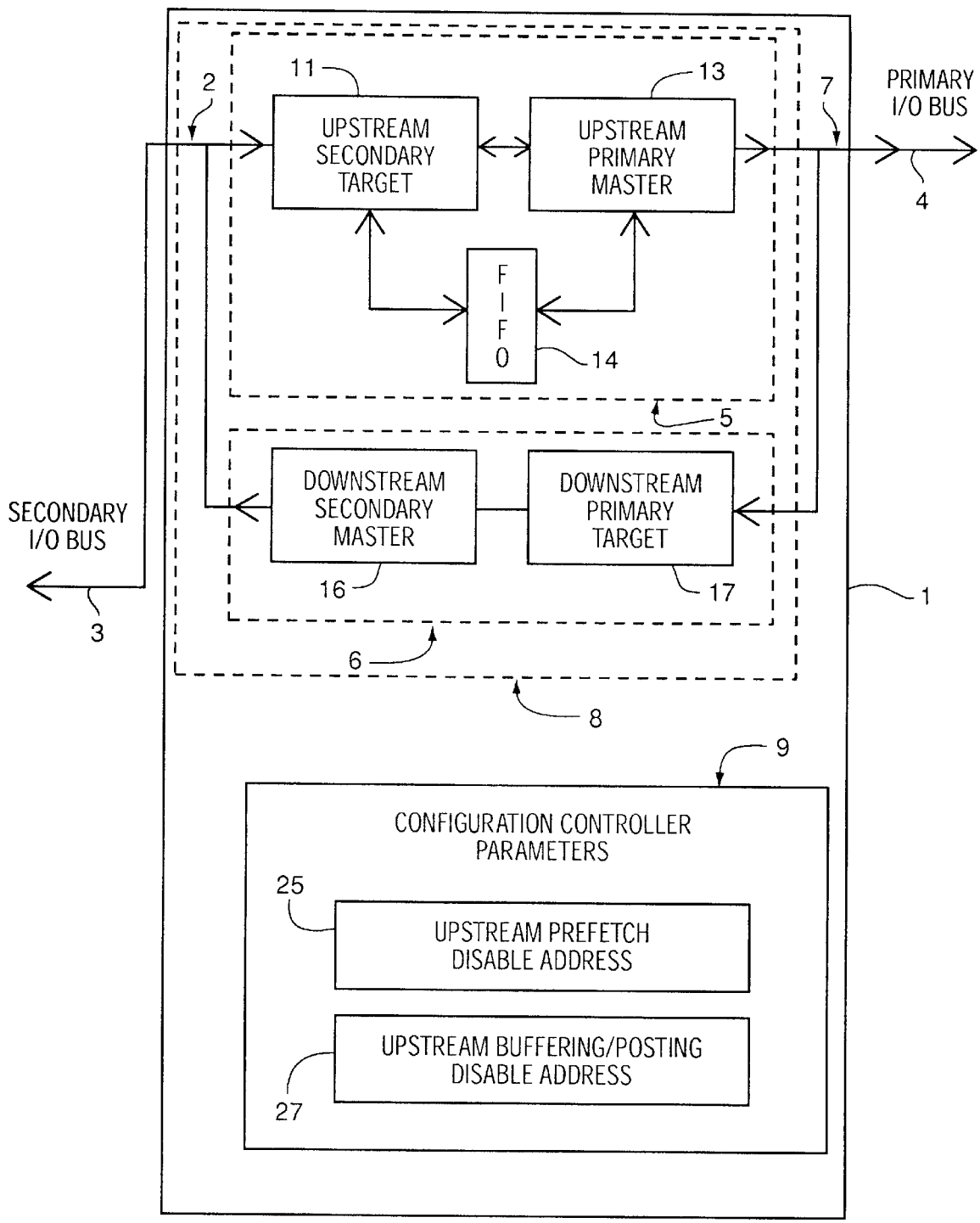
FIG. 3 is a block diagram of the bus bridge circuit elements of the present invention.

FIG. 3 is a block diagram showing the bus bridge circuit elements. The upstream flow controller 5 includes a buffer 14 for storing data exchanged between the secondary bus port 2 and the primary bus port 7. The buffer 14 is a first-in-first-out (FIFO) buffer. The buffer is coupled to an upstream primary master circuit 13 and an upstream secondary target circuit 11.

The upstream primary master circuit 13 is coupled to the primary I/O bus port 7. The upstream primary master circuit 13 performs data bursts when the PCI bus is in burst mode and sends or receives upstream transaction data via the primary I/O bus 4. The upstream secondary target circuit reads or writes data from the secondary I/O bus 3 to the bus bridge 1. The upstream secondary target 11 circuit is coupled to the secondary I/O bus port 2.

The downstream flow controller 6 includes a downstream secondary master circuit 16 coupled to a downstream primary target circuit 17. The downstream secondary master circuit 16 is coupled to the secondary I/O port 2. The downstream secondary master circuit performs data bursts when the PCI bus is in burst mode and sends or receives downstream transaction data via the secondary I/O bus 3. The downstream primary target circuit is coupled to the primary I/O port 7 and reads or writes downstream transaction data from the primary I/O bus 7 to the bus bridge 1.

The configuration controller 9 comprises of at least one register 25, 27 for configuring use of the bridge flow circuit 8 for upstream data transactions. The address range is used to configure the upstream primary bus master 13 for upstream transaction memory reads or writes for targets falling within the address range without effecting the use of the upstream primary bus master 13 for upstream transaction memory read or writes of other targets.

The programmable register 25 stores an address base and limit of targets on the primary I/O bus that do not support read prefetch of upstream transaction memory data. The present invention uses the stored address base and limit to selectively configure the upstream primary bus master 13 to prevent read prefetch of upstream memory data for the targets that fall within the address range. The upstream primary master 13 disables the prefetch capability of the busmaster for a select target on the primary I/O bus by preventing bursting and converting a Memory Read Multiple command or Memory Read Line command to a non-prefetch Memory Read command.

If the address of a target does not fall within the address range programmed in the register, the upstream primary master 13 allows the requested read prefetch of upstream memory data for the target. Thus, the bus bridge circuit 1 continues to allow prefetch of upstream memory data for those targets on the primary I/O bus whose prefetch capability is still enabled.

The present invention also allows the FIFO buffer 14 to be separately configurable. If prefetch is enabled and the FIFO buffer is enabled, the upstream primary master 13 prefetches multiple data locations and stores the data in the FIFO buffer 14. Otherwise if the FIFO buffer 14 is not enabled, the upstream primary master 13 prefetches only one data location after each read request.

The programmable register 27 additionally stores the address base and limit of targets on the primary I/O bus that should be guaranteed immediate delivery of upstream transaction data. For these targets, the buffering or posting of upstream transaction memory write commands is selectively disabled to allow immediate delivery of upstream transaction data. For example when an upstream transaction memory write command start address falls within this address range, the upstream primary master 13 will not utilize the FIFO buffer 14 during the transfer of data. The initiating secondary memory write transaction and the resulting primary bus memory write transaction occur sequentially, that is, in lock step. This method guarantees timely delivery of the data and immediate return of write transfer status for the initiating external secondary PCI bus master.

Otherwise, when the address of a device does not fall within the address range programmed in the register, the present invention allows, that is, enables the buffering or posting of upstream transaction memory write commands thereby eliminating lock step delivery of upstream transaction data. Thus, the present invention provides immediate delivery of upstream transaction data for select targets and buffering/posting of upstream transaction memory write commands for those targets on the primary I/O bus that do not require immediate delivery of upstream transaction data.

As in prior PCI bus bridges, if necessary, prefetch of upstream transaction memory reads and buffering or posting of upstream transaction memory writes for all targets may be globally disabled. As is in prior PCI bus bridges, this is accomplished by providing a global prefetch disable control bit, in the configuration controller 9, to prevent blind prefetch of upstream transaction memory reads. Additionally, as in prior PCI bus bridges, the present invention provides a global write buffer or posting disable control bit, in the configuration controller 9, to prevent write buffering or posting.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A bus bridge circuit comprising:
   a primary bus port connecting said bus bridge to at least one target on a primary PCI bus;
   a secondary bus port connecting said bus bridge to at least one initiator on a secondary PCI bus;
   an upstream flow controller for directing data between said secondary bus port and said primary bus port wherein said upstream flow controller includes an upstream buffer coupled to said primary bus port and to said secondary bus port and wherein said upstream buffer is selectively used in upstream transactions from said secondary bus port to said primary bus port; and
   at least one register for configuring selective use of said upstream buffer during upstream data transactions between said at least one initiator and a subset of said at least one target.

2. The bus bridge circuit of claim 1 wherein said at least one register stores at least one address range for selectively disabling use of said upstream buffer for prefetch of memory reads between said at least one initiator and said subset of said at least one target.

3. The bus bridge circuit of claim 2 wherein said at least one register comprises:
   a base register storing the base address of the target; and
   a limit register storing the extension address of the target.

4. The bus bridge circuit of claim 1 wherein said at least one register stores at least one address range for selectively disabling use of said upstream buffer for buffering of write data between said at least one initiator and said subset of said at least one target.

5. The bus bridge circuit of claim 4 wherein said at least one register comprises:
   a base register storing the base address of the target; and
   a limit register storing the extension address of the target.

6. A bus bridge circuit comprising:
   a primary bus port connecting said bus bridge to at least one target on a primary PCI bus;
   a secondary bus port connecting said bus bridge to at least one initiator on a secondary PCI bus;
   an upstream flow controller for directing data between said secondary bus port and said primary bus port wherein said upstream flow controller includes an upstream buffer coupled to said primary bus port and to said secondary bus port and wherein said upstream buffer is selectively used in upstream transactions from said secondary bus port to said primary bus port;
   at least one register storing at least one address range for selectively disabling use of said upstream buffer for prefetch of memory reads between said at least one initiator and a subset of said at least one target; and
   at least one register storing at least one address range for selectively disabling use of said upstream buffer for buffering of write data between said at least one initiator and a subset of said at least one target.

7. A PCI bus to PCI bus bridge comprising:
   a primary bus port connecting said bus bridge to at least one target on a primary I/O bus;
   a secondary bus port connecting said bus bridge to at least one initiator on a secondary I/O bus;
   upstream flow controller means for directing data between said secondary bus port and said primary bus port wherein said upstream flow controller means includes upstream buffer means coupled to said primary bus port and to said secondary bus port and wherein said upstream buffer means is selectively used in upstream transactions from said secondary bus port to said primary bus port; and
   configuring means for configuring selective use of said upstream buffer means during upstream data transactions between said at least one initiator and a subset of said at least one target.

8. The PCI bus to PCI bus bridge of claim 7 wherein said configuring means comprises at least one register means storing at least one address range for selectively disabling use of said upstream buffer means for prefetch of memory reads between said at least one initiator and a subset of said at least one target.

9. The PCI bus to PCI bus bridge of claim 7 wherein said configuring means comprises at least one register means storing at least one address range for selectively disabling use of said upstream buffer means for buffering of write data between said at least one initiator and a subset of said at least one target.

\* \* \* \* \*